United States Patent [19]

Takase et al.

[11] Patent Number: 4,967,410

[45] Date of Patent: Oct. 30, 1990

[54] METHOD OF MULTIPLEXING DIGITAL SIGNALS AND APPARATUS THEREFOR

[75] Inventors: Akihiko Takase, Tokyo; Yoshitaka Takasaki, Tokorozawa, both of Japan

[73] Assignee: Hitachi, Ltd., Tokyo, Japan

[21] Appl. No.: 324,656

[22] Filed: Mar. 17, 1989

[30] Foreign Application Priority Data

Mar. 18, 1988 [JP] Japan .................................. 63-63244

[51] Int. Cl.⁵ ............................................. H04J 3/06
[52] U.S. Cl. ................................ 370/105.1; 370/108; 370/112
[58] Field of Search .................... 370/84, 100.1, 105.1, 370/105.2, 105.3, 105.4, 106, 108, 112; 375/111, 114, 118

[56] References Cited

U.S. PATENT DOCUMENTS

| | | | |
|---|---|---|---|
| 4,133,981 | 1/1979 | Kibler | 370/105.3 |
| 4,698,806 | 10/1987 | Graves et al. | 370/100 |
| 4,709,375 | 11/1987 | Robinton et al. | 370/108 |
| 4,764,921 | 8/1988 | Graves et al. | 370/105.1 |

OTHER PUBLICATIONS

American National Standard, T1X1.4 Optical Rates and Formats Subworking Group, TlX1.4/87–505R2, Sep. 25, 1987, pp. 12–13, 42–47.

Primary Examiner—Douglas W. Olms
Assistant Examiner—Melvin Marcelo
Attorney, Agent, or Firm—Antonelli, Terry, Stout & Kraus

[57] ABSTRACT

A high speed digital signal multiplexing method and apparatus are provided wherein a plurality of first higher bit rate transmission frames are provided, each first higher bit rate transmission frame being multiplexed therein with lower bit rate signals in an n-byte (n is an integer) interleave manner, and the lower bit rate signals are selectively derived from the plurality of first higher bit rate transmission frames and multiplexed into a second higher bit rate transmission frame. When a phase conflict is detected among the derived lower bit rate signals, all the data columns of at least one of the derived lower bit rate signals are given a predetermined delay by means of a shift register, and the derived signals are multiplexed into the second higher bit rate transmission frame. When a first higher bit rate transmission frame asynchronous with the system frame is detected, a pointer is derived which pointer represents a predetermined information unit within the derived lower bit rate signal. The derived pointer is inserted into a time slot corresponding to the frame pattern position of the second higher bit rate transmission frame for the lower bit rate signal. Thereafter, the derived signals are multiplexed.

13 Claims, 11 Drawing Sheets

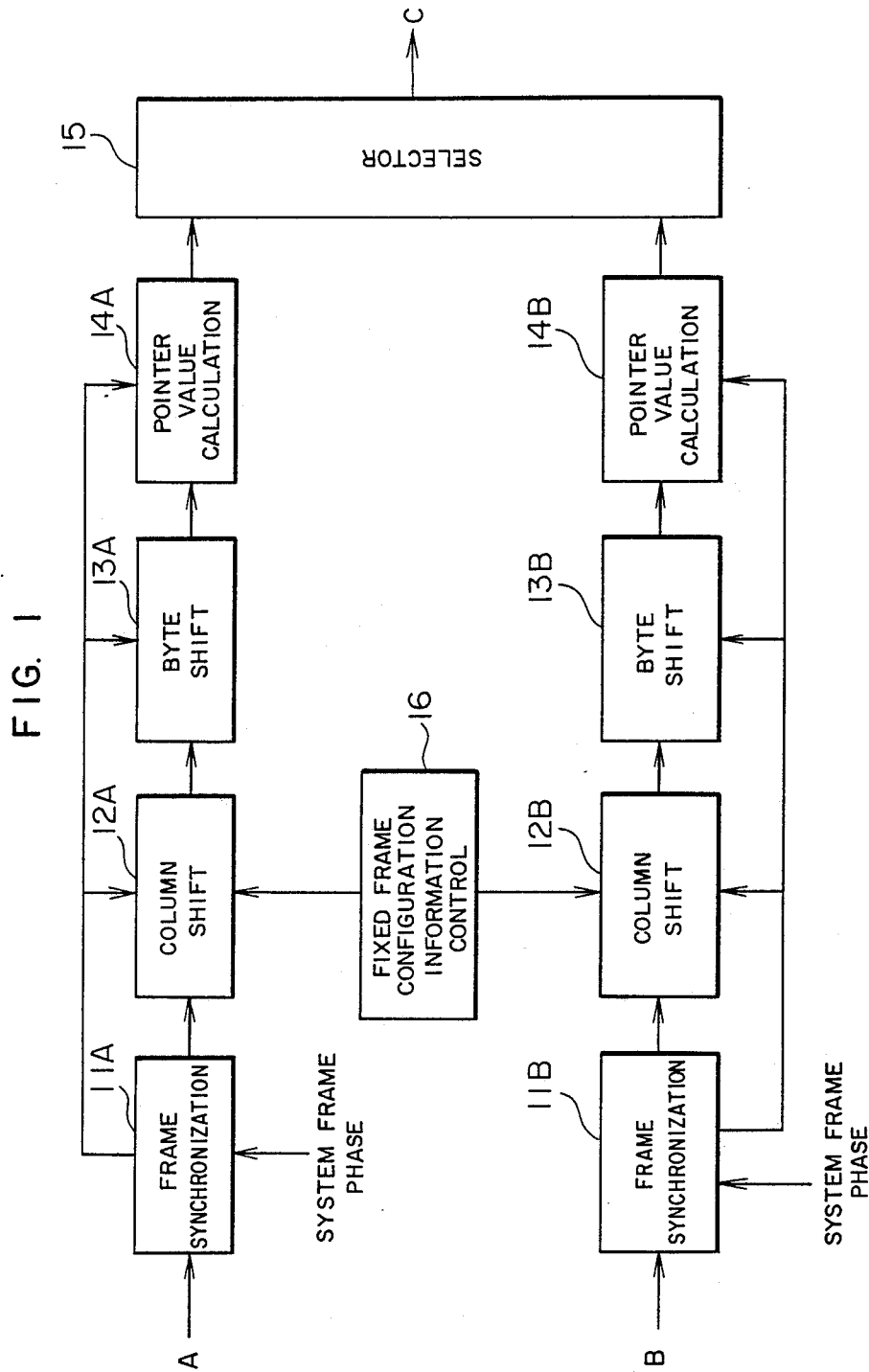

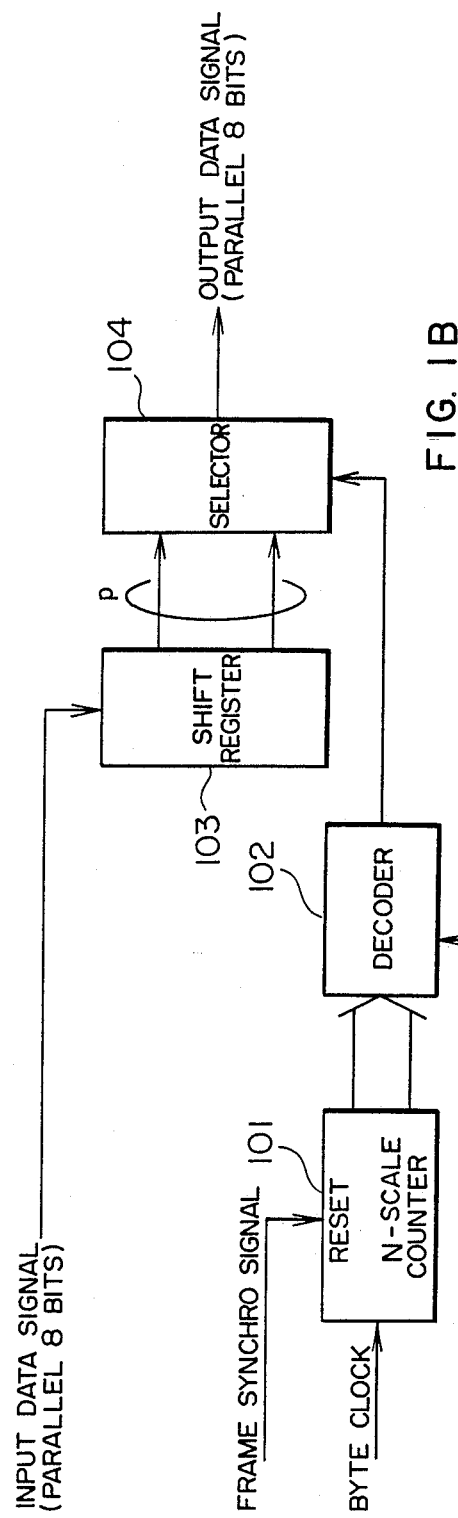
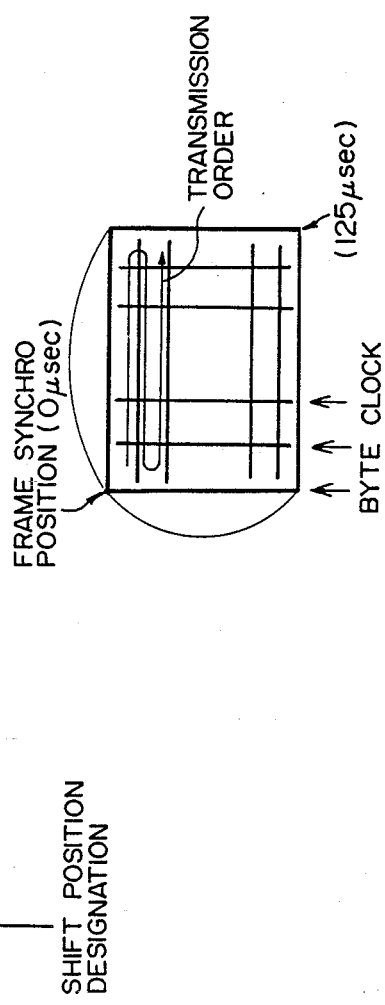
FIG. 1A
FIG. 1B

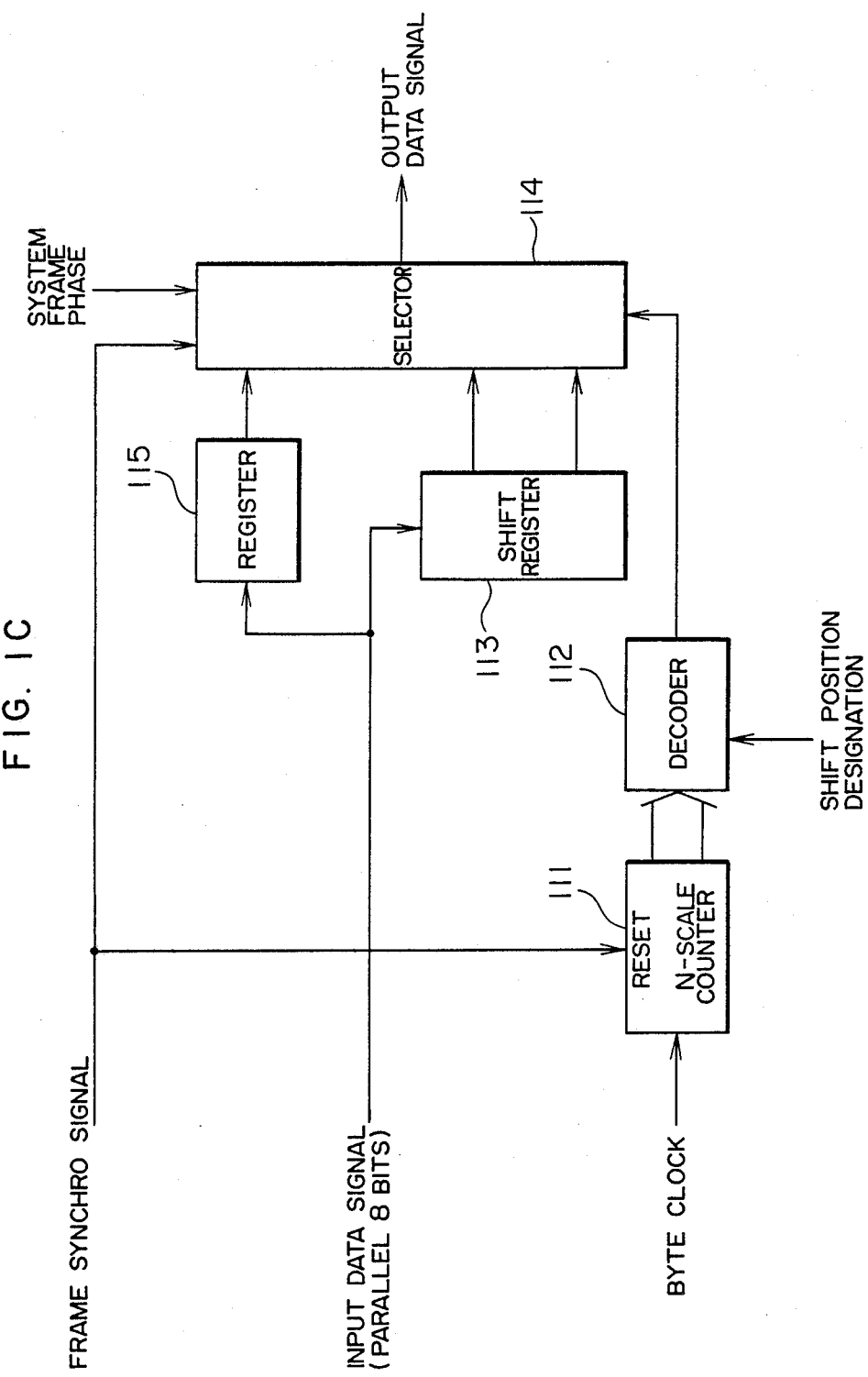

BEFORE FRAME SYNCHRONIZATION

AFTER FRAME SYNCHRONIZATION

F: HIGHER BIT RATE FRAME PATTERN
P: LOWER BIT RATE FRAME PATTERN

COLUMN SHIFT

BYTE SHIFT

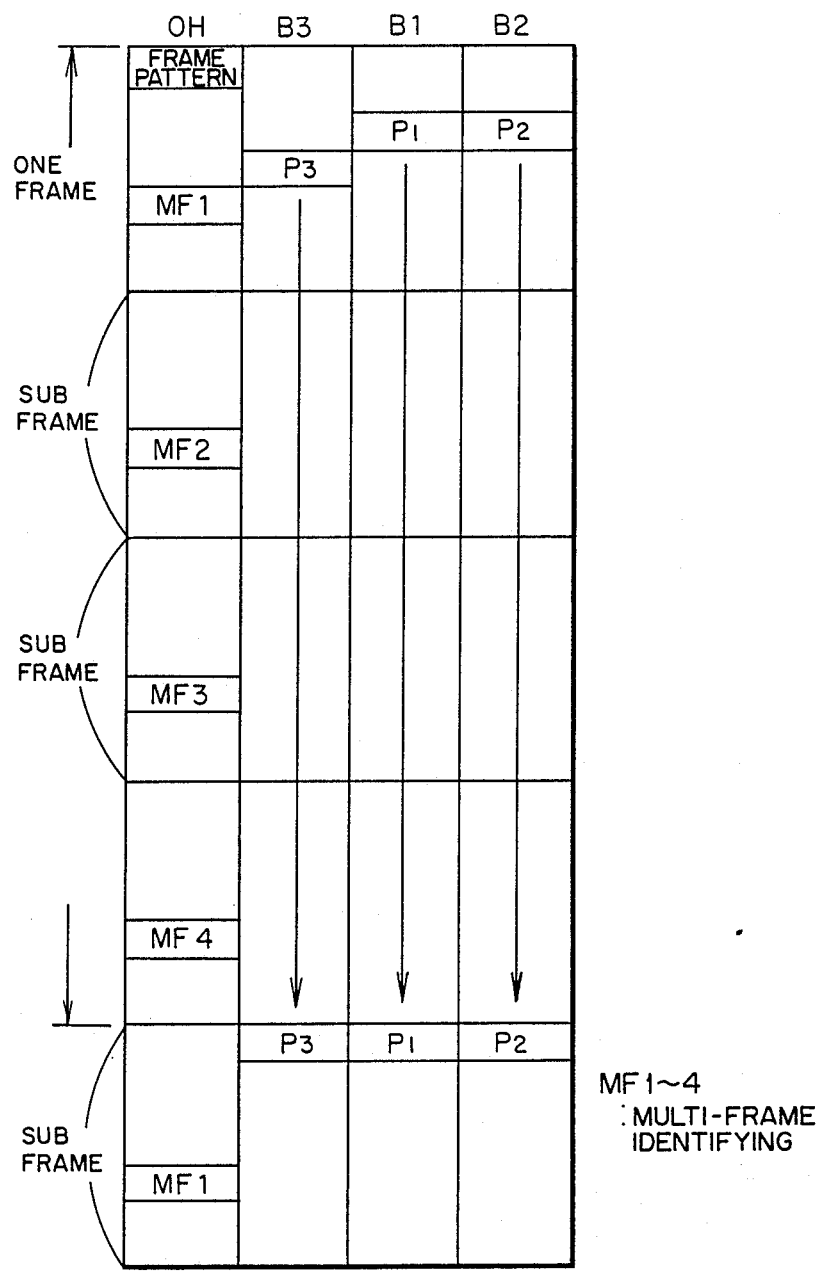

METHOD OF MULTIPLEXING DIGITAL SIGNALS AND APPARATUS THEREFOR

BACKGROUND OF THE INVENTION

This invention relates to a method and apparatus for time division multiplexing digital signals, and more particularly to a frame alignment technique for multiplexing plural digital signals.

There is known a so-called floating frame method of time division multiplexing plural tributary digital signals into higher bit rate digital signals. According to such time division multiplexing method as discussed in U.S. Pat. No. 4,698,806 and in American National Standard, TIX 1.4/87–505R2, 1987 at page 13, higher end bit rate transmission frames are handled asynchronously to thus realize reduction of delays and buffer capacities during frame alignment.

As shown in FIG. 2, the head portions indicated by a letter F of lower bit rate signals A1, A2 and A3 multiplexed into a higher bit rate transmission frame A are not aligned, i.e., the lower bit rate frame phases are asynchronous with each other, when adopting the floating frame method. Similarly, the lower bit rate frame phases of signals B1, B2 and B3 multiplexed into another higher bit rate transmission frame B are not aligned.

Lower bit rate signals A2, B1 and B3, by way of example, cross-connected from such higher bit rate signals and multiplexed into a signal C are also asynchronous with each other. Frame alignment is adapted to be effected only when lower bit rate signals are inputted to an apparatus such as a switching apparatus requiring frame phase synchronization, so that a delay to be caused by the frame alignment is suppressed to the minimum since digital signal processing in the signal path is carried out without frame alignment.

The phase of a higher bit rate transmission frame is used as a reference phase for frame alignment of respective lower bit rate signals. More particularly, a higher bit rate signal takes a frame configuration as shown in FIG. 3, and a phase difference between the higher bit rate transmission frame and the head position of each lower bit rate signal is identified by the value of each corresponding pointer by which frame alignment can be conducted. The pointer is derived from each lower bit rate signal on the basis of a frame synchronizing signal of the higher bit rate transmission frame. Each element shown in FIG. 3 corresponds to a segment constituting each frame, the segment being constructed of, e.g., 1 byte of data. An arrow indicates the order of data transmission, namely, the higher bit rate transmission frame together with its frame overhead OH shown in FIG. 2 is transmitted in a time division multiplexed byte-interleaved manner. In FIG. 3, a set of overhead bytes and a set of respective lower bit rate signal bytes, shown one below another in FIG. 3, are called a column. A frame pattern as depicted in FIG. 3 is a pattern indicating that the location thereof is the head of a 125-microsecond data frame, for example. Pointers P1 to P3 as depicted in FIG. 3 indicate the positions of respective lower bit rate signals relative to the higher bit rate frame.

If lower bit rate signals A2, B1 and B3, for example, are selected from the difference higher bit rate signals A and B shown in FIG. 2 to multiplex them into a new higher bit rate signal C, then it becomes necessary to synchronize the frames of the different higher bit rate signals A and B. In this case, it is not necessary to control the phases of the higher bit rate signals throughout the whole frame length, but only the overhead portions of the higher bit rate signals are controlled and the values of the pointers are accordingly changed by the amount of the shifted phases. However, the phase of each column including pointer P1, P2 or P3 in the frame configuration shown in FIG. 3 becomes different after multiplexing. This is illustrated in FIGS. 4A and 4B. In FIGS. 4A and 4B, it is assumed by way of example and for clarity that the higher bit rate signal A before multiplexing is synchronous with the system phase, and that the higher bit rate signal B is asynchronous with the system phase. For synchronization purposes, OH and B3 of the signal B are stored in a memory and given delays under control of read timings to thus allow the frame alignment or synchronization between the signals A and B. Further, if the phases of lower bit rate signals A2 and B1 to be multiplexed become the same as shown in FIG. 4B, then it becomes necessary to delay one of them relative to the other. The above-described prior art technique does not consider the phase control between lower bit rate signals having a phase collision so that a large capacity and high speed memory, and complicated control have been needed for practical multiplexing operation.

SUMMARY OF THE INVENTION

It is an object of the present invention to provide a method and apparatus for realizing simple multiplexing of lower bit rate signals selected from higher bit rate frames of different phases.

It is another object of the present invention to provide a technique of avoiding phase collision with a minimum delay control in multiplexing lower bit rate signals selected from different high bit rate frames.

In order to achieve the above objects, the phase control in multiplexing lower bit rate signals derived from different higher bit rate frames is carried out at two different stages. At the first stage, the phases of respective lower bit rate signals to be multiplexed are shifted in units of a column so as to prevent the lower bit rate signals from having the same phase, namely one of the signals is given a delay. More particularly, as shown in FIG. 5A, one of the columns having the same phase among columns in a higher bit rate frame is shifted in the row or lateral direction. Such shift means giving a signal to be shifted a delay in time domain.

Further, at the second stage, the data units, e.g. bytes corresponding in amount to the pointer value in each lower bit rate signal are shifted in accordance with the phase of the high bit rate transmission frame as shown in FIG. 5B. More particularly, the data segments corresponding in amount to the pointer value are given a predetermined delay to align the data segments with the time slot for the frame pattern of the overhead.

The processes of forming a higher bit rate frame shown in FIG. 3 by multiplexing lower bit rate signals, are composed of two independent operations. At the first operation, the phase of at least one of the lower bit rate signals to be multiplexed and having the same phase is shifted. At the second operation, pointer information of the lower bit rate signals is inserted in accordance with the frame phase of a new higher bit rate signal.

The first operation corresponds to the lateral shift of a column of an associated lower bit rate signal in FIG. 3. The second operation is equivalent to the operation of erasing the original pointer values and inserting new pointer information. In other words, the original pointer information block is shifted in accordance with the new higher bit rate transmission frame to change the contents of the block.

As above, for the transmission frame constructed on the basis of the floating frame method, the multiplexing operation can be separated into two independent operations, resulting in simple control for multiplexing.

BRIEF DESCRIPTION OF THE DRAWINGS

FIG. 1. is a block diagram showing a digital signal multiplexing system according to an embodiment of this invention;

FIG. 1A is a block diagram showing the circuit arrangement of the column shift circuit shown in FIG. 1;

FIG. 1B is a diagram explaining the operation of the system shown in FIG. 1;

FIG. 1C is a block diagram showing the circuit arrangement of the byte shift circuit shown in FIG. 1;

FIGS. 6A, 6B, 7, 8A and 8B are diagrams used for explaining the multiplexing method according to another embodiment of this invention.

DESCRIPTION OF THE PREFERRED EMBODIMENTS

Figure 5A:
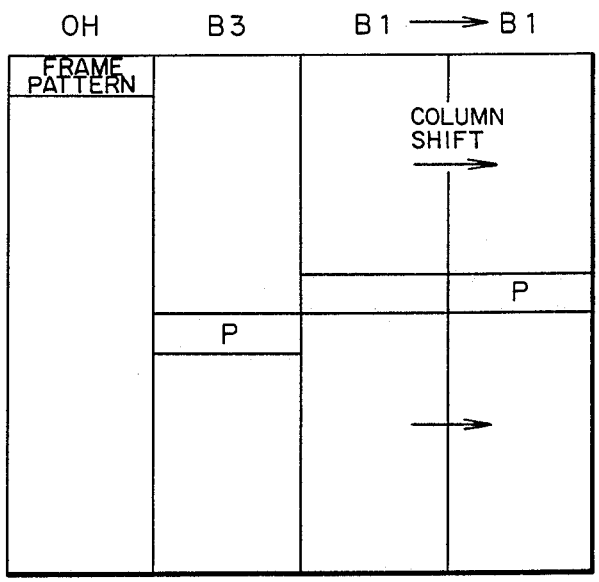
FIGS. 5A and 5B are diagrams used for explaining the principle and function of the present invention.
Figure 5B:
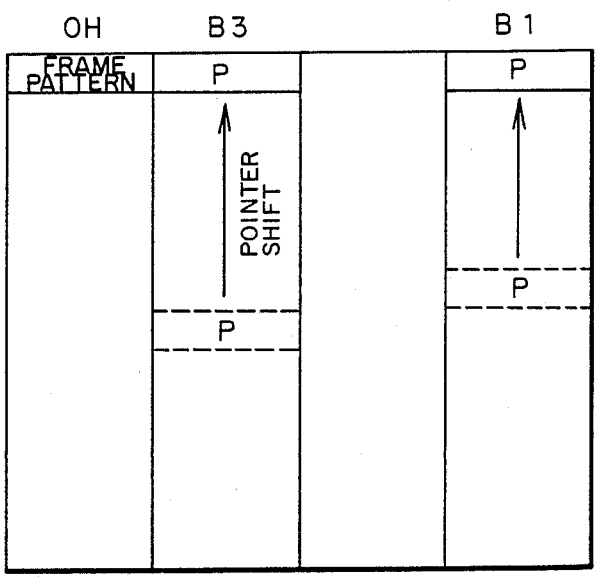

FIG. 1 is a block diagram showing the circuit arrangement of the digital signal multiplexing system according to an embodiment of this invention. In this embodiment, it is assumed by way of example and for convenience of description that a lower bit rate signal A2 in a higher bit rate signal A and lower bit rate signals B1 and B3 in a higher bit rate signal B are multiplexed to form a new higher bit rate signal C. The system shown in FIG. 1 includes higher bit rate frame synchronization circuits 11A and 11B, column shift circuits 12A and 12B, byte shift circuits 13A and 13B, pointer value calculation circuits 14A and 14B, and a selector 15 constructed of a time-division multiplexer. FIGS. 5A and 5B illustrate a column shift for one of lower bit rate transmission signals having a phase conflict relation, and a change in pointer phase, respectively.

Figure 4A:
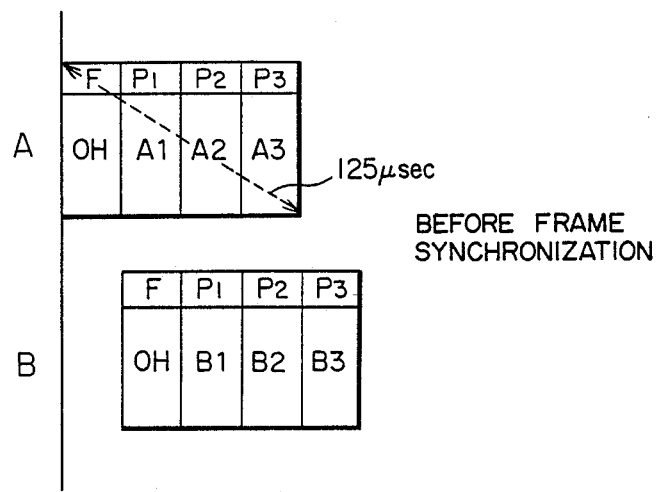
Figure 4B:
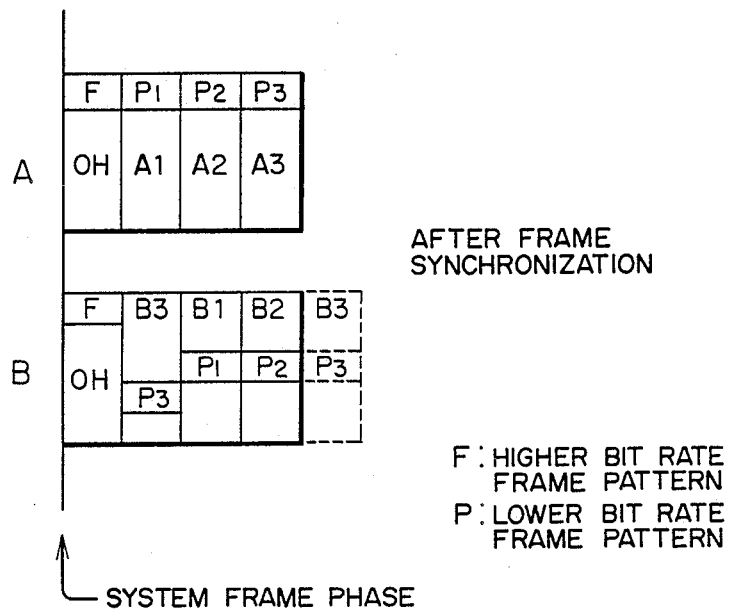

The higher bit rate transmission frames A and B at the input side are supplied to the higher bit rate frame synchronization circuits 11A and 11B, respectively, whereat the phases of their overhead portions are aligned with the frame phase of the system including a cross connect. An offset of the phase of a higher bit rate frame is usually present relative to the system frame phase, as shown in FIG. 4A and 4B. For the purpose of simplicity, however, in FIGS. 4A and 4B it is assumed that the transmission frame A is already aligned with the system frame, and only the transmission frame B has an offset relative to the system frame.

The column shift circuits 12A and 12B detect the lower bit rate signals A2 and B1 which have the same phase, and delays one of the signals A2 and B1, in this embodiment, signal B1 by an amount corresponding to one column so that signal B1 delays from signal A2. The column shift circuits have a function to selectively delay a lower bit rate signal.

The byte shift circuits 13A and 13B shift data blocks including pointer information, in this embodiment, bytes in each column, by the amount necessary to cancel out the offset caused by the frame synchronization, particularly synchronization with the system frame. The pointer information can be obtained by the pointer calculation circuits 14A and 14B through addition of the original pointer information and that corresponding to the offset.

Connected to the column shift circuits is a control circuit 16 for controlling the column shift circuits. The control circuit 16 previously stores therein fixed frame configuration information such as the names of lower bit rate signals to be multiplexed, types of pointers and the like. Synchronization signals are supplied to the circuits 11A, 13A and 14A, and 11B, 13B and 14B for synchronization of higher bit rate signal frames. In this embodiment, a circuit for processing two higher bit rate signal frames A and B is shown. It is obvious that a circuit for processing a third higher bit rate signal frame C may be added in parallel with the first-mentioned circuit.

The lower bit rate signal frames, after being processed as above, are time divisionally selected and combined together by selector 15 to generate a desired multiplexed output signal C. The selector 15 may use the circuit described in the above-referenced U.S. patent.

FIGS. 1A and 1B, 1C and 1D show the embodiments of the column shift circuit, byte shift circuit and pointer calculation circuit, respectively.

In the column shift circuits 12A and 12B shown in FIG. 1A, an N-scale counter 101 counts byte clocks from a byte clock source to generate a signal for identifying a column position. A decoder 102 decodes the generated column position identifying signal for comparison with a shift position designation signal to thereby generate a selection instruction signal for a column to be shifted. A P-scale high speed shift register 103 (P is an integer) is provided for temporarily storing parallel data signals of 8 bits for example. A selector 104 connected to the output of the shift register 103 selects the outputs of the shift register in accordance with the selection instruction signal outputted from the decoder 102. The P-scale shift register 103 can shift O to P columns. FIG. 1B schematically illustrates a transmission frame constructed of N×M bytes with one frame period of 125 microseconds, and the transmission order of bytes, and byte clocks.

In the byte shift circuits 13A and 13B shown in FIG. 1C, an N-scale counter 111, decoder 112, shift register 113 and selector 114 are analogous to the corresponding elements 101 to 104 shown in FIG. 1A. The selector 114 is controlled such that the circuit operates only upon those columns to be byte-shifted. To this end, only one byte overhead is stored in a register 115. For the other columns, the output of the shift register 113 is switched between the old frame phase, i.e., frame synchronization signal and the new frame phase, i.e., system frame phase, to thereby effect one byte shift.

Figure 1D:
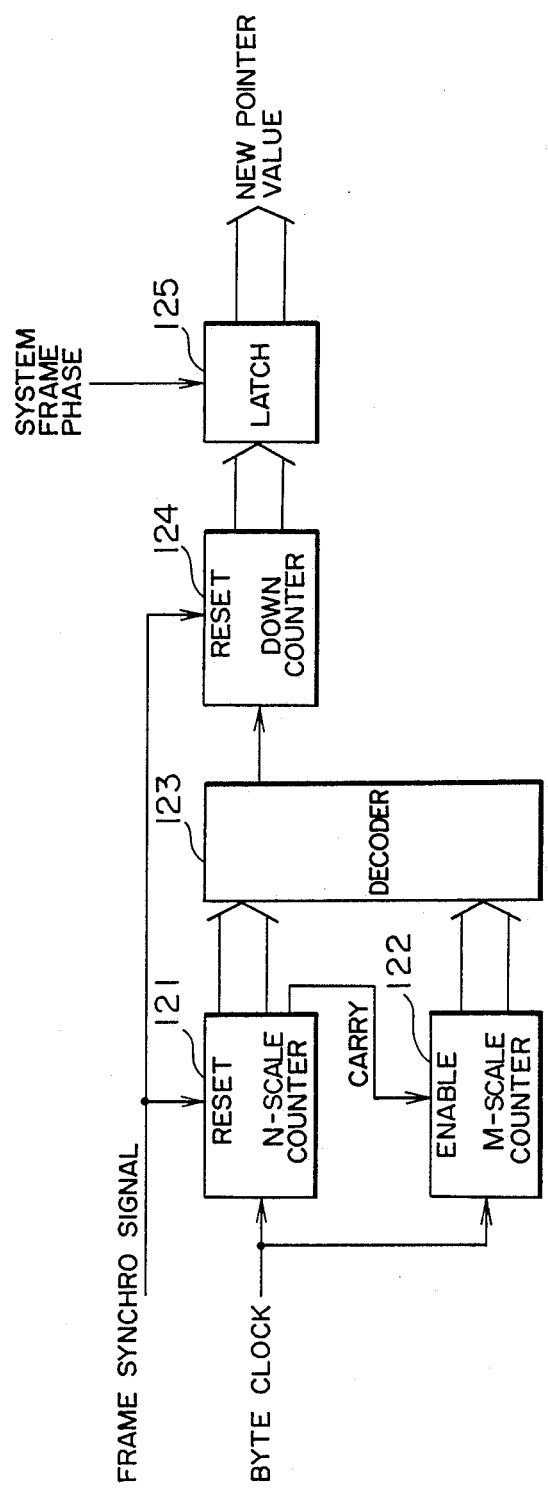
FIG. 1D is a block diagram showing the detailed circuit arrangement of the pointer calculation circuit shown in FIG. 1D.
Figure 2:
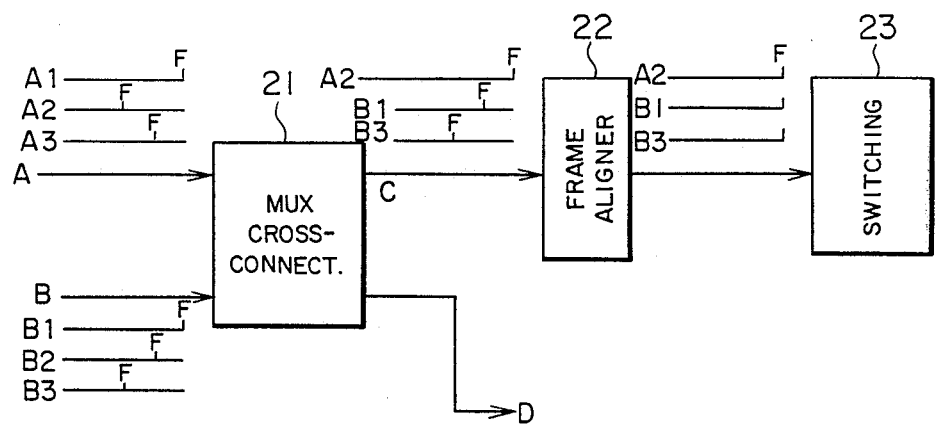
FIGS. 2, 3, 4A and 4B are diagrams used for explaining the multiplexing method according to the conventional floating frame method.
Figure 3:
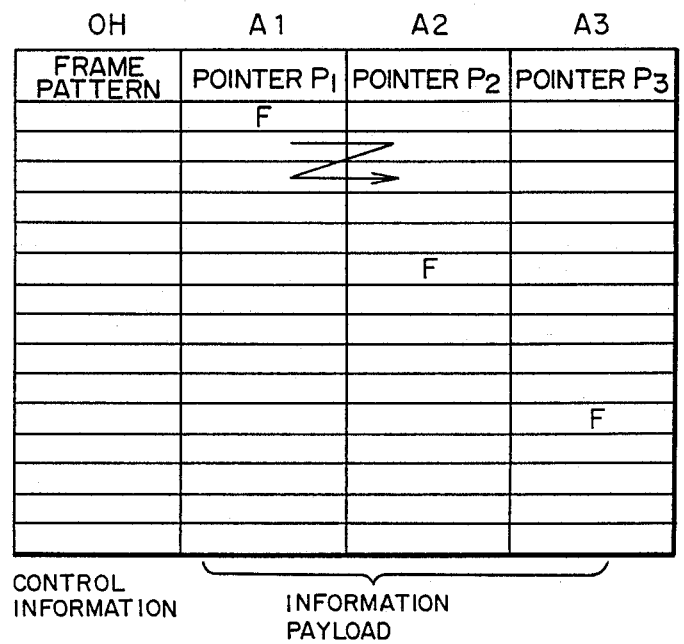

Each of the pointer calculation circuits 14A and 14B shown in FIG. 1D is constructed of an N-scale counter 121 for counting byte clocks, an M-scale counter 122 which is enabled by a carry from the N-scale counter 121 and counts byte clocks to indicate the byte position within the N x M byte frame, a decoder 123, a downcounter 124 for counting the number of bytes between the old and new frame phases, and a latch circuit 125 for latching the output of the counter 124 and outputting the new pointer value in synchronization with the system frame phase.

Figure 6A:
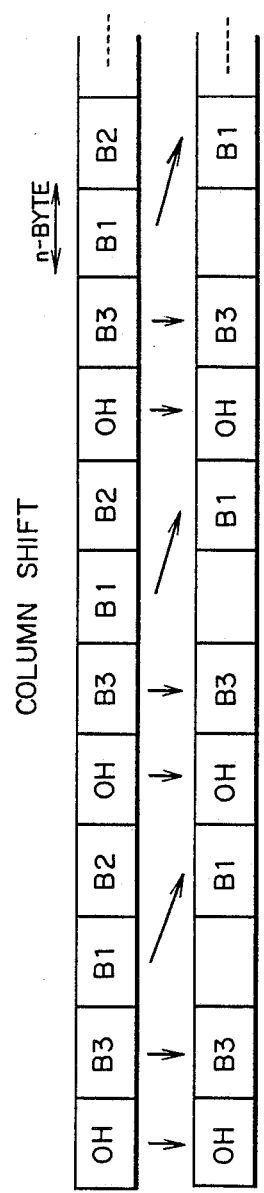
Figure 6B:
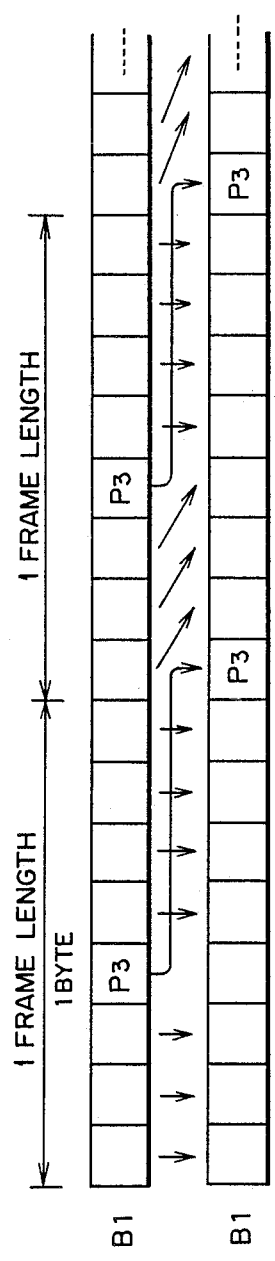

FIGS. 6M and 6B are diagrams illustrating the functions of the column shift circuit and byte shift circuit with respect to signal B1, as seen in connection with the transmission order of lower bit rate signals of the higher bit rate signal frame B. Both the circuits are characterized in that each circuit can be realized by using a shift register for temporary data storage, the buffer length may be in the order of 1 byte, and a delay caused by cross connect is small.

FIG. 7 illustrates a phase shift format according to another embodiment of this invention. In this embodiment, lower bit rate signals are multi-framed, with various overhead information MF1, MF2, MF3 and MF4 being included. Each sub-frame is identified using the multi-frame identification information included in the overhead of the higher bit rate frame in each multi-frame. Also in this case, a column shift circuit similar to that shown in FIG. 1A can be used and the byte shift circuit is caused to operate in units of multi-frame length. As a multi-frame, the structure of V7 system frame shown in FIG. 11 of the above-referenced document "American National Standard" may be used.

Figure 8A:
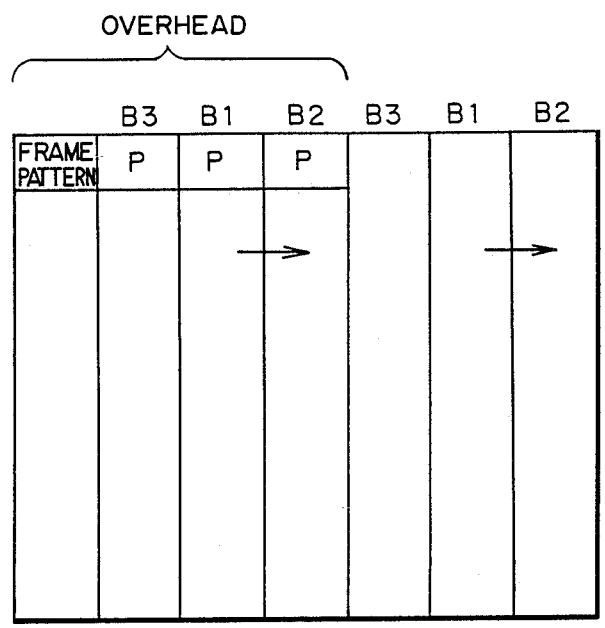
Figure 8B:
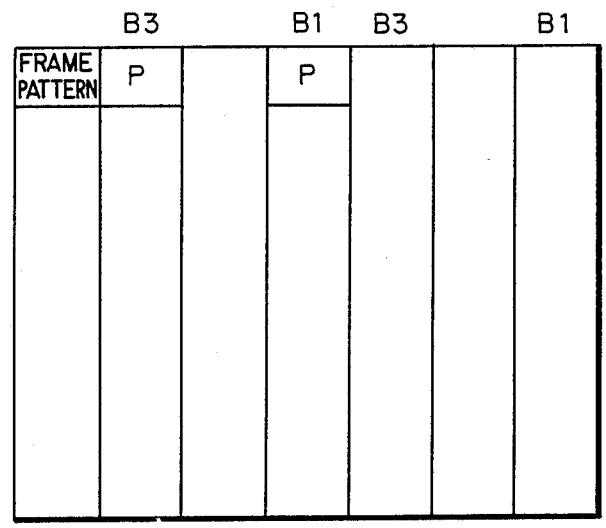

FIGS. 8A and 8B show a modification of overhead according to a further embodiment of this invention. In this embodiment frame format, pointers of respective lower bit rate signals are collectively provided in a portion of the overhead of the higher bit rate signal frame. It can be considered therefore that all the pointers are provided in the first column. In such a case, after conducting frame synchronization of different higher bit rate signal frames, the column shift circuit shifts the phases of a certain lower bit rate signal and also certain pointer information so as to avoid the same phase during multiplexing. This embodiment is advantageous in that although significant transmission information is dispersed or distributed into a plurality of columns, multiplexing is realized through application of the column shift circuit only to a certain lower bit rate signal and certain pointer information.

Figure 9:
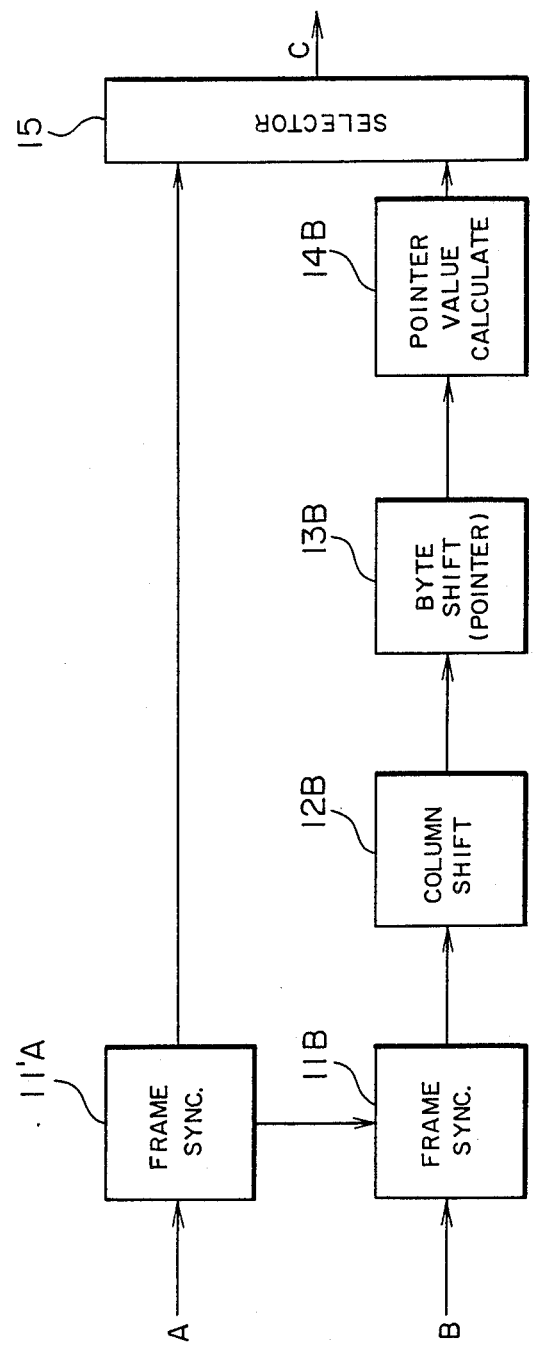
FIG. 9 is a block diagram showing the circuit arrangement of a modification of the system shown in FIG. 1.

FIG. 9 shows a modification of the first embodiment shown in FIG. 1. In this embodiment, as the reference phase for performing synchronization of higher bit rate signal frames, one of the inputted higher bit rate signal frames is used. The reference phase is generated at a frame synchronization circuit 11A' and supplied to another frame synchronization circuit 11B. With such a circuit arrangement, a column shift circuit 12A, byte shift circuit 13A and pointer value calculation circuit 14A on the side of the frame synchronization circuit II' A can be dispensed with. The operation on this side corresponds to that of the higher bit rate signal frame A described with reference to FIGS. 4A and 4B.

In the above embodiments, the byte shift circuit is provided as the succeeding stage of the column shift circuit. However, this order may be reversed without creating any problem, which is obvious from the fact that the two operations can be independently executed.

In the above embodiments, a cross connect has been used by way of example. However, this invention is also applicable to multiplexing information signals from a plurality of signal sources into a transmission frame. Namely, information signals from each signal source are multiplexed into a higher bit rate transmission frame. Some of the multiplexed higher bit rate signals are selected and multiplexed into a final transmission frame. With such method, various types of information signals can be multiplexed in a uniform manner.

As described so far, according to the present invention, multiplexing into a floating type transmission frame can be performed by two independent processings so that the circuit arrangement of multiplexer and cross connection can be simplified.

What is claimed is:

1. A digital signal multiplexing method wherein a plurality of transmission frames of a first transmission rate are provided, each transmission frame being multiplexed therein with signals of a second transmission rate in a predetermined interleave segment manner, said first transmission rate being substantially greater than said second transmission rate, and wherein said signals of said second transmission rate are selectively derived from said plurality of transmission frames of said first transmission rate and multiplexed into a transmission frame of said first transmission rate different from said plurality of transmission frames, comprising the steps of:

detecting a collision or conflict of the relative phase between said signals of said second transmission rate selectively derived from said plurality of transmission frames;

in response to detection of said phase collision, providing a predetermined delay to all the predefined segments of at least one of said selectively derived signals of said second transmission rate to generate a first signal representative of a non-delayed segment stream and a second signal representative of a delayed segment stream; and multiplexing said first and second segment streams.

2. A digital signal multiplexing method according to claim 1, comprising a step of synchronizing the phase of said plurality of transmission frame of said first transmission rate with a predetermined system frames phase.

3. A digital signal multiplexing method according to claim 1, wherein said signal of said second transmission rate has the frame period, multiplied by an integer, of said transmission frame of said first transmission rate.

4. A digital signal multiplexing method wherein a plurality of transmission frames of a first bit rate are provided, each transmission frame being multiplexed therein with signals of a second bit rate in an n-byte interleave manner, said first bit rate being substantially greater than said second bit rate, and wherein a plurality of said signals of said second bit rate are selectively derived from said plurality of transmission frames of said first bit rate and multiplexed into another transmission frame of said first bit rate, comprising the steps of:

synchronizing the phases of said plurality of transmission frames of said first bit rate selectively derived with a predetermined system frame phase;

providing a predetermined delay to all the bytes of at least one of said derived signals of said second bit rate which are in a phase conflict relation to each other; and when a phase shift is detected for any of said plurality of transmission frames of said first bit rate at said synchronizing step, deriving a predetermined information unit within said signal of said second bit rate of said phase shift detected frame, and inserting said predetermined information unit into another time slot of said signal of said second bit rate.

5. A digital signal multiplexing method according to claim 4, wherein said predetermined system frame is one of said plurality of transmission frame of said first bit rate.

6. A digital signal multiplexing method according to claim 4, wherein at least one of said plurality of signals of said second bit rate has the frame period, multiplied by an integer, of said transmission frame of said first bit rate.

7. A digital signal multiplexing method wherein information representative of the frame phases of lower bit rate signals multiplexed into a higher bit rate transmission frame is located in a portion of the overhead of the higher bit rate transmission frame, and some of the lower bit rate signals are derived from a plurality of higher bit rate transmission frames and multiplexed into another higher bit rate transmission frame, comprising the steps of:

in response to a phase conflict detected among a plurality of lower bit rate, frames derived for multiplexing, providing a predetermined delay to all the bytes of at least one of said lower bit rate frames; and providing a predetermined delay to a portion of said overhead, said portion being associated with said lower bit rate signal.

8. A digital signal multiplexing method wherein a plurality of first transmission frames of a first transmission rate are provided, each first transmission frame being multiplexed therein with signals of a second transmission rate in a predetermined interleave segment length manner, and said signals of said second transmission rate are selectively derived from said plurality of first transmission frames of said first transmission rate and multiplexed into a transmission frame of a third transmission rate different from said plurality of first transmission frames, said first and third transmission rates being substantially greater than said second transmission rate, and wherein each first transmission frame included a control information segment inclusive of a synchro signal, and a plurality of signal segments representative of the signals of the second transmission rate, and each signal segment is located at a predetermined position relative to the synchro signal and includes an information unit representative of a segment position within its first transmission frame, comprising the steps of:

synchronizing the phases of said plurality of first transmission frames with a predetermined system frame phase; and after said synchronization, deriving said information units within said signals of said second transmission rate of each said first transmission frame, and moving said information units to time slot positions satisfying said predetermined position relative to said synchro signal.

9. A digital signal multiplexing method wherein a plurality of first transmission frames of a first transmission rate are provided, each first transmission frame being multiplexed therein with signals of a second transmission rate in an n-byte (n is an integer) interleave manner, and said signals of said second transmission rate are selectively derived from said plurality of first transmission frames of said first transmission rate and multiplexed into a transmission frame of the first transmission rate different from said plurality of first transmission frames, said first transmission rate being substantially greater than said second transmission rate, and wherein each first transmission frame includes an overhead inclusive of a synchronization signal, and a plurality of signal bytes representative of the signals of the second transmission rate, and each signal byte is located at a predetermined position relative to the synchronization signal and includes a pointer representative of a byte position within its first transmission frame, comprising the steps of:

synchronizing the phases of said plurality of first transmission frames with a predetermined system frame phase; and after said synchronization, deriving said pointers within said signals of said second transmission rate of each said first transmission frame, and moving said pointers to time slot positions satisfying said predetermined position relative to said synchronization signal, and when a phase conflict is detected after said synchornization among said signals of said second transmission rate derived from said plurality of first transmission frames, providing a predetermined delay to all the bytes of at least one of said signals of said second transmission rate to eliminate said phase conflict among said signals to be multiplexed.

10. A digital signal multiplexing system wherein a plurality of first transmission frames of a first transmission rate are provided, each first transmission frame having multiplexed therein signals of a second transmission rate in an n-byte (n is an integer) interleave manner, and the system includes means for selectively deriving said signals of said second transmission rate from said plurality of first transmission frame of said first transmission rate and means for multiplexing the derived signals of said second transmission rate into a transmission frame of the first transmission rate different from said plurality of first transmission frames, said first transmission rate being substantially greater than said second transmission rate, and wherein each first transmission frame includes an overhead portion inclusive of a synchronization signal, and a plurality of signal bytes representative of the signals of the second transmission rate, and each signal byte is located at a predetermined position relative to the synchronization signal and includes a pointer representative of a byte position within its first transmission frame, the system comprising:

means for supplying control information for shifting a column formed by the signals of the second transmission rate to be multiplexed in accordance with frame configuration information;

means for synchronizing the phases of said plurality of first transmission frames with a predetermined system frame phase;

byte shift circuit means for deriving, after said synchronization, said pointers within said signals of said second transmission rate of each said first transmission frame, and moving said pointers to time slot positions satisfying said predetermined position relative to said synchronization signal; and column shift circuit means, responsive to control information from said control information supplying means, for providing a predetermined delay, when a phase conflict is detected among said signals of said second transmission rate derived from said plurality of first transmission frames, to all the bytes of at least one of said signals of said second transmission rate to eliminate said phase conflict.

11. A system according to claim 10, wherein said byte shift circuit means and said column shift circuit means each include a high speed shift register whereby a desired signal delay is provided by controlling read/write timings of said shift register.

12. A digital signal multiplexing method wherein a plurality of first transmission frames of a first transmission rate are provided, each first transmission frame being multiplexed therein with signals of a second transmission rate in an n-byte (n is an integer) interleave manner, and said signals of said second transmission rate are selectively derived from said plurality of first transmission frames of said first transmission rate and multiplexed into a transmission frame of the first transmission rate different from said plurality of first transmission frames, said first transmission rate being substantially greater than said second transmission rate, and wherein each first transmission frame includes an overhead inclusive of a synchronization signal, and a plurality of signal bytes representative of the signals of the second transmission rate, and each signal byte is located at a predetermined position relative to the synchronization signal and includes a pointer representative of a byte position within its first transmission frame, the system comprising:

synchronizing the phases of said plurality of first transmission frames with a predetermined system frame phase; and after said synchronization, deriving said pointers within said signals of said second transmission rate of each said first transmission frame, and when a phase conflict is detected after said synchronization among said signals of said second transmission rate derived from said plurality of first transmission frames, providing a predetermined delay to all the bytes of at least one of said signals of said second transmission rate to eliminate said phase conflict among said signals to be multiplexed.

13. A digital signal multiplexing method according to claim 4, wherein said plurality of signals of said second bit rate have individual frame periods, multiplied by integers, of said transmission frame of said first bit rate.

* * * * *